June 10, 1958     C. E. SCHIEBERL     2,838,064
SAFETY GUARD FOR VALVES
Filed May 14, 1956

INVENTOR.
CHARLES E. SCHIEBERL,
BY
C. L. Drew
ATTORNEY

United States Patent Office 2,838,064
Patented June 10, 1958

2,838,064

SAFETY GUARD FOR VALVES

Charles E. Schieberl, San Leandro, Calif.

Application May 14, 1956, Serial No. 584,687

3 Claims. (Cl. 137—382)

This invention relates to a safety guard for valves and has particular reference to a valve on outdoor faucets.

The principal object of this invention is to provide an inexpensive cap or cover for the hand wheel of an exposed outdoor faucet of the type to which a garden hose may be connected.

A further object is to produce a device of this character which can be easily applied and removed by an adult, but which, because of its construction, will present a baffling problem for an infant.

Other objects and advantages of my invention will be in part evident to those skilled in the art and in part pointed out in connection with the accompanying drawing, wherein there is shown by way of illustration and not of limitation a preferred embodiment of my invention.

In the accompanying drawings forming a part of this specification and in which like numbers are employed to designate like parts throughout the same.

Figure 1:
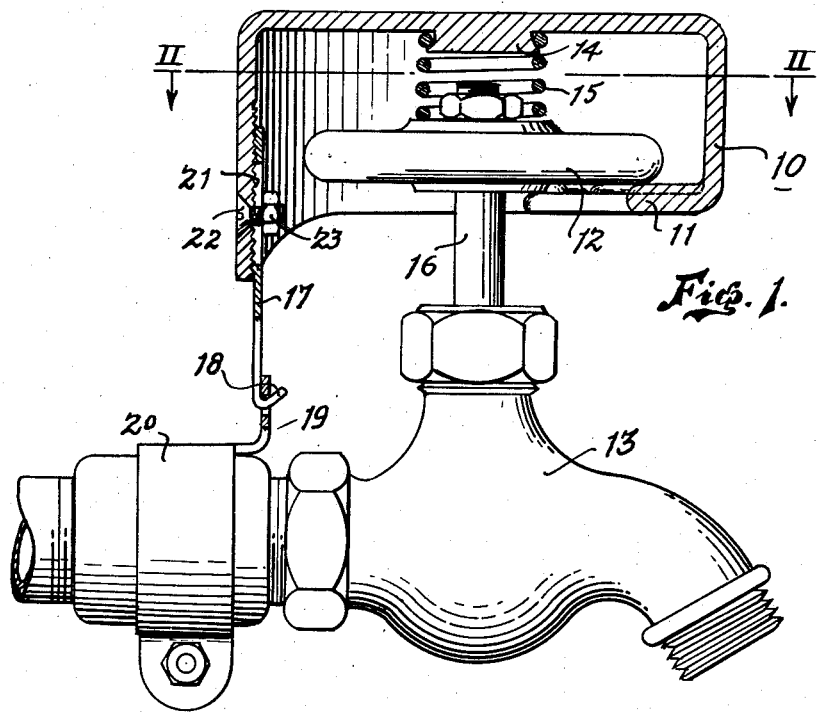
Figure 2:
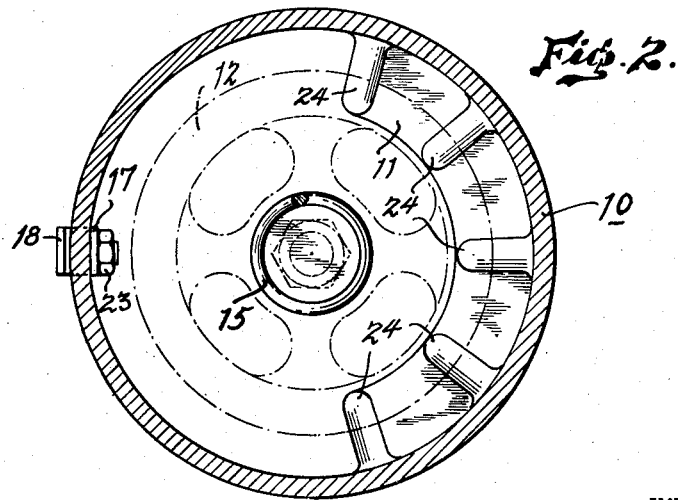

Fig. 1 is a vertical sectional view showing my invention as applied to a conventional faucet of the type having a hand-wheel operating member; and Fig. 2 is a sectional view taken along the line II—II of Fig. 1, looking downwardly in the direction of the arrows when removed from the valve.

While there are many instances where a safety guard of expensive construction might be fully justified as in various industrial plants where the opening and/or closing of a valve may result in serious consequences, the primary purpose of my present invention is to provide a simple and inexpensive guard for an exposed garden hose outlet such as a faucet, which is generally located within easy reach of an infant, and it is to prevent the inadvertent opening of a valve of this type by an infant and also the malicious opening of the valve with the consequent waste of water by an older youngster in the neighborhood who might consider this a playful thing to do.

With the above in mind, it is also important that the device be inexpensive and of such a nature that it can be easily applied and removed from the valve without special tools and with a minimum of inconvenience. As shown in the accompanying drawing, wherein for the purpose of illustration is shown a preferred embodiment of my invention, my improved safety guard comprises an inverted cup-like member 10 with a lip 11 that extends inwardly at its inner edge throughout a portion of its circumference.

As indicated in the drawing, this lip is disposed and arranged so as to extend under the rim of a valve operating hand wheel, here designated by the numeral 12, which is carried by a conventional faucet or valve 13.

At is center the cup-like member 10 is shown as having an undercut boss about which the end turn of a compression spring 15 is disposed and secured in a downward direction toward the open side of the cup-like member 10. This spring 15 is of such construction and stiffness that it will exert a downward pressure upon the hub of the hand wheel 12 and is of such a diameter that it will be normally centered thereover by the nut with which the hand wheel 12 is secured to a stem 16 of the valve or faucet 13.

Diametrically opposite the inwardly extending lip 11, I provide a depending latch 17 that has a detent-engaging hook 18 at its lower end. Upon the pipe or conduit to which the faucet 13 is connected, there is a latch detent 19, which, in the present instance, is formed upon a clamping band 20, carried by a nipple through which the faucet 13 is connected to a conventional water supply pipe.

In order to render the safety guard application to valves of different dimensions and/or types of mountings, I show the latch member 17 as having a serrated surface that engages with a corresponding surface 21 against which it is secured by a threaded screw 22 and a nut 23.

As is more clearly shown in Fig. 2 of the drawing, the inwardly extending lip 11 is of a dimension sufficient to underlie the rim of the hand wheel 12, here shown by dot and dash lines. At spaced points therearound, the lip 11 has radially extending ribs 24 that may be relied upon to retain the lip 11 under an operating member for the faucet 13 which may not be in the form of a hand wheel. With these radially extending bosses, it has been found that the guard can be effectively used on a standard cross-bar operating member when the cross-bar is not directly in alignment with the latching member 17 when applied to such a valve.

Normally, when confronted with the valve guard, constructed as here proposed, an infant naturally tries to displace and remove the guard by applying an upward force, but as will be seen, this would not be effective.

On the contrary, a downward pressure with the palm of the hand sufficient to compress the spring, the cup-like member or cap may be easily shifted to the right by a rocking movement of the compression spring 15 and at the same time, the latch 17 will disengage the detent 19 carried by the faucet connection.

It should be stated that the spring 15 is of relatively stiff construction and will require a considerable down force to release the latch 17.

It is to be understood that the form of my invention herewith shown and described is to be taken as a preferred example of the same and that various changes relative to the material, size, shape and arrangement of parts may be resorted to without departing from the spirit of the invention or the scope of the subjoined claims. I desire it understood that this invention is not limited to the specific form disclosed, but may be embodied in other ways that will suggest themselves to persons skilled in the art.

Having thus described my invention, I claim:

1. A safety guard for fluid-controlling valves, said valve having a fluid conduit and a manual valve-operating member, an inverted cup-like member having an inturned radially arranged lip on one side thereof, said lip being adapted and arranged to be disposed under one side of said valve-operating member, a centrally disposed compression spring secured centrally within said cup-like member and extending downwardly into pressure-exerting engagement with the hub of said valve-operating member, a latch member carried by and extending downwardly from said cup-like member opposite said inwardly projecting lip, and a latch detent mounted upon said fluid conduit to effect in cooperation with said spring an upward pressure on said inwardly projecting lip of said cup-like member against said operating member.

2. A safety guard for fluid-controlling valves, said valve having a fluid conduit and a manual valve-operating member, an inverted cup-like member having an inturned radially arranged lip extending partially around its opening, said lip being adapted and arranged to be disposed under one side of a valve-operating member, a compression spring secured centrally within said cup-like member and extending downwardly into pressure-exerting engagement with said valve-operating member, an adjustable latch member carried by and extending downwardly from said cup-like member opposite its inwardly projecting lip, and a latch detent mounted upon the said fluid conduit to effect upward pressure on said inwardly projecting lip of said cup-like member through the cooperation of said spring when the device is applied to a valve.

3. In a safety guard for fluid-controlling valves, said valve having a fluid conduit and a manual valve-operating member, an inverted cup-like member having an inwardly projecting lip extending partially around its lower edge and underlying said valve-operating member, a centrally disposed spring-retaining means within said cup, a compression spring carried by said retaining means extending downwardly for engagement with the valve-operating member, a latch member carried by said cup-like member opposite its inwardly projecting lip, and a stationary detent carried by said conduit upon which the valve is mounted, said latch member and said detent operating to hold said cup-like member in a fixed position upon the valve with said compression spring in a compressed condition.

References Cited in the file of this patent
UNITED STATES PATENTS

| | | |
|---|---|---|
| 140,223 | Sisson | June 24, 1873 |
| 2,308,643 | Bucknam | Jan. 19, 1943 |

FOREIGN PATENTS

| | | |
|---|---|---|
| 21,342 | Great Britain | of 1909 |